(12) United States Patent
Ohiwa (10) Patent No.: US 10,399,444 B2
(45) Date of Patent: Sep. 3, 2019

(54) MOTOR VEHICLE

(71) Applicant: Toyota Jidosha Kabushiki Kaisha, Toyota-shi Aichi-ken (JP)

(72) Inventor: Shingo Ohiwa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 147 days.

(21) Appl. No.: 15/821,024

(22) Filed: Nov. 22, 2017

(65) Prior Publication Data

US 2018/0147948 A1 May 31, 2018

(30) Foreign Application Priority Data

Nov. 29, 2016 (JP) .................................. 2016-231330

(51) Int. Cl.
| | | |
|---|---|---|
| B60L 11/18 | (2006.01) | |
| H02J 7/00 | (2006.01) | |
| H02J 7/14 | (2006.01) | |
| B60L 53/14 | (2019.01) | |
| B60L 53/60 | (2019.01) | |
| B60L 58/12 | (2019.01) | |
| B60L 53/30 | (2019.01) | |

(52) U.S. Cl.
CPC ........... *B60L 11/1816* (2013.01); *B60L 53/14* (2019.02); *B60L 53/305* (2019.02); *B60L 53/60* (2019.02); *B60L 58/12* (2019.02); *H02J 7/0027* (2013.01); *H02J 7/0055* (2013.01); *H02J 7/0072* (2013.01); *H02J 7/1492* (2013.01); *Y02T 10/7005* (2013.01); *Y02T 10/7241* (2013.01)

(58) Field of Classification Search
CPC ...... B60L 11/1816; B60L 53/60; B60L 53/14; B60L 58/12; B60L 53/305; H02J 7/0027; H02J 7/0055; H02J 7/0072; H02J 7/1492; Y02T 10/7005; Y02T 10/7241
See application file for complete search history.

(56) References Cited

U.S. PATENT DOCUMENTS

2012/0274277 A1   11/2012   Masuda et al.

FOREIGN PATENT DOCUMENTS

| JP | 05-010201 A | 1/1993 |
|---|---|---|
| JP | 2014-109869 A | 6/2014 |
| JP | 2016014940 A | 1/2016 |
| WO | 2011086695 A1 | 7/2011 |

*Primary Examiner* — Robert L Deberadinis
(74) *Attorney, Agent, or Firm* — Dinsmore & Shohl LLP (57) ABSTRACT

A first control device is configured to start sending a first command when a vehicle-side connector is connected with an external power supply device. A second control device is configured to send a second command when the second control device receives the first command from the first control device. A third control device is configured to be kept in the active state when the third control device receives the second command from the second control device. A motor vehicle is configured to perform external charging the third control device is in the active state. Additionally, the third control device is configured to be kept in the active state when the third control device in the active state stops receiving the second command from the second control device but still receives the first command from the first control device.

7 Claims, 5 Drawing Sheets

MOTOR VEHICLE

CROSS-REFERENCE TO RELATED APPLICATIONS

The present application claims priority to Japanese Patent Application No.2016-231330 filed Nov. 29, 2016, which is incorporated herein by reference in its entirety including specification, drawings and claims.

TECHNICAL FIELD

The present disclosure relates to a motor vehicle.

BACKGROUND

In a proposed configuration of a motor vehicle equipped with a main micro computer and a sub-microcomputer, on completion of activation of the sub-microcomputer, the sub-microcomputer determines whether the main microcomputer outputs a WD pulse, so as to determine whether the sub-microcomputer is restored (activated) from a low power consumption mode by an IG-ON operation or is reactivated in an IG-ON state (as described in, for example, JP 2014-10306A).

SUMMARY

A recently proposed configuration of a motor vehicle includes a first control device that starts sending a first command when an external power supply device is connected with a vehicle-side connector that is connected with a power storage device; a second control device that sends a second command when the second control device receives the first command from the first control device; and a third control device that enables an external charging state that charges the power storage device with an electric power from the external power supply device when the third control device starts receiving the second command from the second control device, and keeps the external charging state when the third control device receives the second command from the second control device. In this motor vehicle, when the second control device stops sending the second command, for example, in the case where the second control device is reactivated, during the external charging, the third control device may not keep the external charging state and may cause the external charging to be terminated halfway (i.e., may cause the power storage device to be charged only insufficiently).

A motor vehicle of the present disclosure mainly aims to suppress external charging from being terminated halfway.

In order to achieve the above primary object, the motor vehicle of the present disclosure employs the following configuration.

The present disclosure is directed to a first motor vehicle. The motor vehicle includes a power storage device configured to transmit electric power to and from a driving system for driving the motor vehicle, a vehicle-side connector connected with the power storage device and configured to be connectable with an external power supply device, a first control device configured to start sending a first command when the vehicle-side connector is connected with the external power supply device, a second control device configured to send a second command when the second control device receives the first command from the first control device, and a third control device configured to be activated to an active state when the third control device starts receiving the second command from the second control device, to be kept in the active state when the third control device in the active state receives the second command from the second control device, and to manage the power storage device when the third control device is in the active state. The motor vehicle is configured to perform external charging that charges the power storage device with an electric power from the external power supply device when the vehicle-side connector is connected with the eternal power supply device and the third control device is in the active state. The third control device is configured to be communicable with the first control device and to be kept in the active state when the third control device in the active state stops receiving the second command from the second control device but still receives the first command from the first control device.

In the motor vehicle according to the first aspect of the present disclosure, the first controller starts sending the first command when the vehicle-side connector is connected with the external power supply device. The second control device sends the second command when the second control device receives the first command from the first control device. The third control device is activated to the active state when the third control device starts receiving the second command from the second control device, is kept in the active state when the third control device in the active state receives the second command from the second control device, and manages the power storage device when the third control device is in the active state. The motor vehicle is configured to perform the external charging that charges the power storage device with the electric power from the external power supply device when the vehicle-side connector is connected with the eternal power supply device and the third control device is in the active state (the third control device manages the power storage device). Additionally, the third control device is configured to be communicable with the first control device and to be kept in the active state when the third control device in the active state stops receiving the second command from the second control device but still receives the first command from the first control device. Even when the second control device stops sending the second command, for example, in the case where the second control device is reactivated, (i.e. , even when the third control device stops receiving the second command) during the external charging, this configuration enables the third control device to be kept in the active state and to continue managing the power storage device as long as the third control device receives the first command. As a result, this enables the external charging to be continued. This accordingly suppresses the external charging from being terminated halfway (i.e., suppresses the power storage device from being charged only insufficiently).

The present disclosure is directed to a second motor vehicle. The motor vehicle includes a power storage device configured to transmit electric power to and from a driving system for driving the motor vehicle, a vehicle-side connector connected with the power storage device and configured to be connectable with an external power supply device, a relay provided between the power storage device and the vehicle-side connector, a first control device configured to start sending a first command when the vehicle-side connector is connected with the external power supply device, a second control device configured to send a second command when the second control device receives the first command from the first control device and a third control device configured to turn on the relay when the third control device starts receiving the second command from the second control device, and to keep the relay on when the relay is on and the third control device receives the second command from the second control device. The motor vehicle is configured to perform external charging that charges the power storage device with an electric power from the external power supply device when the vehicle-side connector is connected with the eternal power supply device and the relay is on. The third control device is configured to be communicable with the first control device and to keep the relay on when the relay is on and the third control device stops receiving the second command from the second control device but still receives the first command from the first control device.

In the motor vehicle according to the second aspect of the present disclosure, the first controller starts sending the first command when the vehicle-side connector is connected with the external power supply device. The second control device sends the second command when the second control device receives the first command from the first control device. The third control device turns on the relay when the third control device starts receiving the second command from the second control device, and keeps the relay on when the relay is on and the third control device receives the second command from the second control device. The motor vehicle is configured to perform the external charging that charges the power storage device with the electric power from the external power supply device when the vehicle-side connector is connected with the eternal power supply device and the relay is on. Additionally, the third control device is configured to be communicable with the first control device and to keep the relay on when the relay is on and the third control device stops receiving the second command from the second control device but still receives the first command from the first control device. Even when the second control device stops sending the second command, for example, in the case where the second control device is reactivated, (i.e., even when the third control device stops receiving the second command) during the external charging, this configuration enables the third control device to keep the relay on as long as the third control device receives the first command. As a result, this enables the external charging to be continued. This accordingly suppresses the external charging from being terminated halfway (i.e., suppresses the power storage device from being charged only insufficiently).

DESCRIPTION OF EMBODIMENTS

The following describes some aspects of the disclosure with reference to embodiments.

Figure 1:
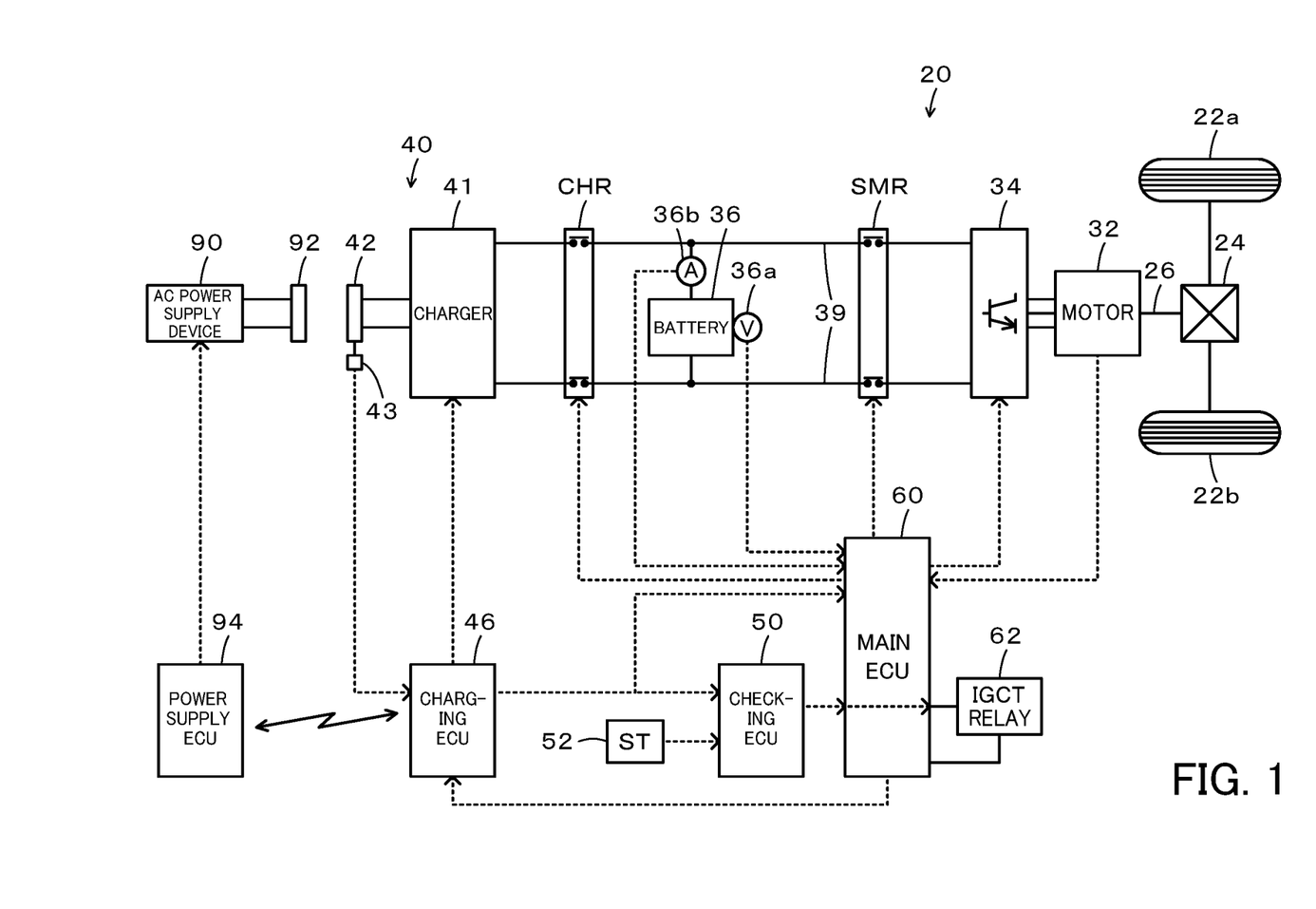
FIG. 1 is a configuration diagram illustrating the schematic configuration of an electric vehicle according to one embodiment of the present disclosure.

FIG. 1 is a configuration diagram illustrating the schematic configuration of an electric vehicle 20 according to one embodiment of the present disclosure. As illustrated, the electric vehicle 20 includes a motor 32, an inverter 34, a battery 36 as a power storage device, a system main relay SMR, a charging relay CHR, a charging unit 40, a charging electronic control unit (hereinafter referred to as "charging ECU") 46, a checking electronic control unit (hereinafter referred to as "checking ECU") 50, a main electronic control unit (hereinafter referred to as "main ECU") 60, and an IGCT relay 62. The motor 32 and the inverter 34 correspond to the "driving system" according to this embodiment.

The motor 32 is configured as, for example, a synchronous generator motor and is connected with a driveshaft 26 that is coupled with drive wheels 22a and 22b via a differential gear 24. The inverter 34 is used to drive the motor 32 and is connected with power lines 39. When a voltage is applied to the inverter 34, the main ECU 60 performs switching control of a plurality of switching elements (not shown) included in the inverter 34 to rotate and drive the motor 32. The battery 36 is configured as, for example, a lithium ion rechargeable battery or a nickel metal hydride battery having a rated voltage of 200 V or 250 V and is connected with the power lines 39.

The system main relay SMR is provided between the battery 36 and the inverter 34 on the power lines 39. This system main relay SMR is controlled on and off by the main ECU 60 to connect and disconnect the battery 36 and the inverter 34 with each other and from each other.

The charging unit 40 includes a charger 41 connected with the power lines 39 on an opposite side to the inverter 34 across the battery 36 and a vehicle-side connector 42 connected with the charger 41. The vehicle-side connector 42 is configured to be connectable with a power supply device-side connector 92 that is connected with an AC power supply device 90 provided as an external power supply device at a charging point such as at home or at a charging station. The charger 41 is configured to perform external charging (AC charging) that charges the battery 36 with electric power from the AC power supply device 90 (with converting AC power into DC power), when the vehicle-side connector 42 is connected with the power supply device-side connector 92. The AC power supply device 90 is configured, for example, as a power supply device including a household power supply or an industrial power supply. The AC power supply device 90 is controlled by a power supply electronic control unit (hereinafter referred to as "power supply ECU") 94. The power supply ECU 94 is configured as a CPU-based microprocessor and includes a ROM configured to store processing programs, a RAM configured to temporarily store data, input/output ports and a communication port, in addition to the CPU, although not being illustrated. This power supply ECU 94 is configured to be communicable with the charging ECU 46 of the electric vehicle 20.

The charging ECU 46 is configured as a CPU-based microprocessor and includes a ROM configured to store processing programs, a RAM configured to temporarily store data, input/output ports and a communication port, in addition to the CPU, although not being illustrated. The charging ECU 46 obtains, via its input port, the input of, for example, a connection signal from a connection sensor 43 configured to detect whether the vehicle-side connector 42 is connected with the power supply device-side connector 92. The charging ECU 46 outputs, for example, control signals to the charger 41 via its output port. The charging ECU 46 is connected with the checking ECU 50 and the main ECU 60 to be communicable with these ECUs 50 and 60.

The charging relay CHR is provided between the battery 36 and the charger 41 on the power lines 39. This charging relay CHR is controlled on and off by the main ECU 60 to connect and disconnect the battery 36 and the charger 41 with each other and from each other.

The checking ECU 50 is configured as a CPU-based microprocessor and includes a ROM configured to store processing programs, a RAM configured to temporarily store data, input/output ports and a communication port, in addition to the CPU, although not being illustrated. The checking ECU 50 obtains the input of, for example, a start signal from a start switch 52 via its input port. The checking ECO 50 is connected with the charging ECU 46 and the main ECU 60 to be communicable with these ECUs 46 and 60.

The main ECU 60 is configured as a CPU-based microprocessor and includes a ROM configured to store processing programs, a RAM configured to temporarily store data, input/output ports and a communication port, in addition to the CPU, although not being illustrated. Various signals are input into the main ECU 60 via its input port. The signals input into the main ECU 60 include, for example, a rotational position θm of a rotor of the motor 32 from a rotational position detection sensor configured to detect the rotational position of the rotor of the motor 32, a voltage Vb of the battery 36 from a voltage sensor 36a mounted between terminals of the battery 36, and an electric current Ib of the battery 36 from a current sensor 36b mounted to an output terminal of the battery 36. The input signals also include a shift position SP from a shift position sensor, an accelerator position from an accelerator pedal position sensor, a brake pedal position from a brake pedal position sensor and a vehicle speed from a vehicle speed sensor. Various controls signals are output from the main ECU 60 via its output port. The signals output from the main ECU 60 include, for example, control signals to the inverter 34, control signals to the system main relay SMR and control signals to the charging relay CHR. The main ECU 60 calculates a state of charge SOC of the battery 36, based on an integrated value of the electric current Ib of the battery 36 input from the current sensor 36b. The main ECU 60 is connected with the charging ECU 46 and the checking ECU 50 to be communicable with these ECUs 46 and 50.

The IGCT relay 62 is a relay serving to activate and deactivate the main ECU 60 (i.e., to start and stop supply of electric power from an auxiliary machinery battery (not shown) to the main ECU 60). This IGCT relay 62 in an off position (to deactivate the main ECU 60) is turned on to activate the main ECU 60, when the main ECU 60 starts receiving a driving start command of the main ECU 60 from the checking ECU 50 in response to an on-operation of the start switch 52 (i.e., when the driving start command is enabled). The IGCT relay 62 is then turned off to deactivate the main ECU 60, when the main ECU 60 stops receiving the driving start command in response to an off-operation of the start switch 52 (i.e., when the driving start command is disabled). The IGCT relay 62 in the off position is also turned on to activate the main ECU 60, when the main ECU 60 starts receiving a charging second command (described later) from the checking ECU 50 (i.e., when the charging second command is enabled) in an off position of the start switch 52. The IGCT relay 62 is then turned off to deactivate the main ECU 60 according to a processing routine of FIG. 2 described later.

The following describes the operations of the electric vehicle 20 of the embodiment having the above configuration or more specifically a series of operations to perform external charging (AC charging) that charges the battery 36 with electric power from the AC power supply device 90. When the vehicle-side connector 42 is connected with the power supply device-side connector 92 in the off position of the start switch 52 at a charging point such as at home or at a charging station, the charging ECU 46 starts sending a charging first command that is a first command for the external charging, to the checking ECU 50 and the main ECU 60 (i.e., enables the charging first command). When the checking ECU 50 receives the charging first command from the charging ECU 46 (i.e., when the checking ECU 50 recognizes that the charging first command is enabled), the checking ECU 50 sends a charging second command that is a second command for the external charging, to the main ECU 60 (i.e., enables the charging second command or keeps the charging second command enabled). When the main ECU 60 starts receiving the charging second command from the checking ECU 50 (i.e., when the main ECU 60 starts recognizing that the charging second command is enabled), the IGCT relay 62 is turned on to activate the main ECU 60. The main ECU 60 then turns on the charging relay CHR and starts sending an external charging request to the charging ECU 46 (i.e., enables the external charging request). When the charging ECU 46 starts receiving the external charging request from the main ECU 60 (i.e., when the charging ECU 46 starts recognizing that the external charging request is enabled), the charging ECU 46 starts sending an AC power supply instruction to the power supply ECU 94 and starts controlling the charger 41. When the power supply ECU 94 receives the AC power supply instruction, the power supply ECU 94 controls the AC power supply device 90 such as to cause an AC power to be output from the AG power supply device 90. Starting the output of the AC power from the AC power supply device 90, along with starting the control of the charger 41, starts charging the battery 36. When the state of charge SOC of the battery 36 reaches or exceeds a reference value Sref (for example, 80%, 85% or 90%) by the external charging (AC charging) and a termination condition of the external charging is satisfied, the main ECU 60 stops sending the external charging request to the charging ECU 46 (i.e., disables the external charging request). When the charging ECU 46 stops receiving the external charging request from the main ECU 60 or when the vehicle-side connector 42 is disconnected from the power supply device-side connector 92 and a deactivation condition of the main ECU 60 is satisfied, the charging ECU 46 stops sending the AC power supply instruction to the power supply ECU 94 and stops controlling the charger 41. Stopping the output of the AC power from the AC power supply device 90, along with stopping the control of the charger 41, stops charging the battery 36. When the deactivation condition of the main ECU 60 is satisfied, the charging ECU 46 also stops sending the charging first command to the checking ECU 50 and the main ECU 60 (i.e., disables the charging first command). When the checking ECU 50 stops receiving the charging first command from the charging ECU 46 (i.e., when the checking ECU 50 recognizes that the charging first command is disabled), the checking ECU 50 stops sending the charging second comment to the main ECU 60 (i.e., disables the charging second command). The IGCT relay 62 is then turned off to deactivate the main ECU 60 according to the processing routine of FIG. 2.

According to this embodiment, after the charging first command is enabled, the charging ECU 46 keeps the charging first command enabled at a predetermined time interval T1 (for example, about 1 hour) until the deactivation condition of the main ECU 60 is satisfied. When the deactivation condition of the main ECU 60 is satisfied, the charging ECU 46 disables the charging first command. Accordingly, the checking ECU 50 and the main ECU 60 recognize whether the charging first command is enabled or disabled at the predetermined time interval T1 or when the charging first command is disabled.

Additionally, according to this embodiment, at a predetermined time interval T2 (for example, about several msec) that is shorter than the predetermined time interval T1, when the checking ECU 50 recognizes that the charging first command is enabled, the checking ECU 50 enables the charging second command or keeps the charging second command enabled. When the checking ECU 50 recognizes that the charging first command is disabled, when the checking ECU 50 is resetting (being reactivated) or when the checking ECU 50 does not recognize that the charging first command is enabled (including the case where the checking ECU 50 does not recognize whether the charging first command is enabled or disabled) after completion of resetting the checking ECU 50, the checking ECU 50 disables the charging second command or keeps the charging second command disabled. Accordingly, the main ECU 60 recognizes whether the charging second command is enabled or disabled at the predetermined time interval T2.

Furthermore, according to this embodiment, after the external charging request is enabled, the main ECU 60 in the active state keeps the external charging request enabled at a predetermined time interval T3 (for example, equal to the predetermined time interval T1) until the termination condition of the external charging is satisfied. When the termination condition of the external charging is satisfied, the main ECU 60 disables the external charging request. Accordingly, the charging ECU 46 recognizes whether the external charging request is enabled or disabled at the predetermined time interval T3 or when the external charging request is disabled.

Figure 2:
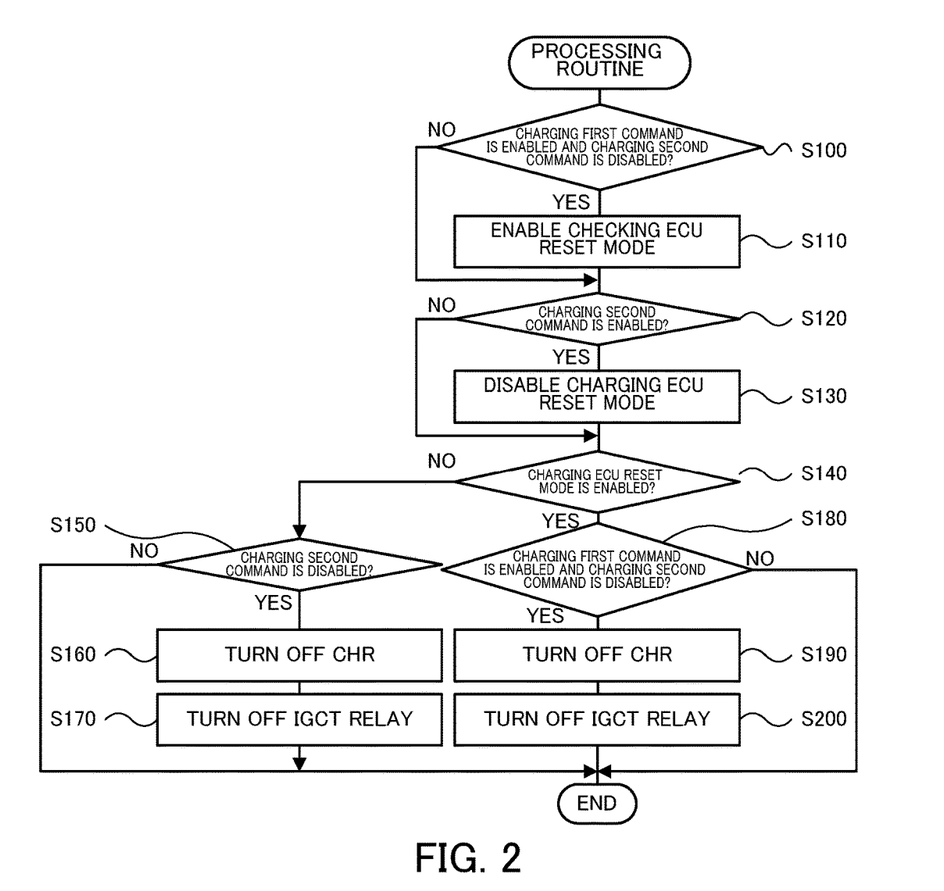
FIG. 2 is a chart showing one example of a processing routine performed by a main ECU.

FIG. 2 is a chart showing one example of a processing routine performed by the main ECU 60. This routine is performed repeatedly at predetermined time intervals T0 (for example, equal to the predetermined time interval T2) when the main ECU 60 is in the active state to keep the charging relay CHR on.

When the processing routine of FIG. 2 is triggered, the main ECU 60 first determines whether a first condition that the main ECU 60 recognizes that the charging first command is enabled and the charging second command is disabled, is satisfied (step S100). When the first condition is satisfied, the main ECU 60 enables a checking ECU reset mode or keeps the checking ECU reset mode enabled (step S110). When the first condition is not satisfied, on the other hand, the main ECU 60 skips the processing of step S110 and keeps the checking ECU reset mode enabled or disabled. The first condition may be satisfied, for example, during a time period from the time when the checking ECU 50 starts resetting (being reactivated) and disables the charging second command to the time when the checking ECU 50 recognizes that the charging first command is enabled after completion of resetting the checking ECU 50 and enables the charging second command again.

The main ECU 60 subsequently determines whether a second condition that the main ECU 60 recognizes that the charging second command is enabled, is satisfied (step S120). When the second condition is satisfied, the main ECU 60 disables the checking ECU reset mode or keeps the checking ECU reset mode disabled (step S130). When the second condition is not satisfied, on the other hand, the main ECU 60 skips the processing of step S130 and keeps the checking ECU reset mode enabled or disabled.

The main ECU 60 subsequently determines whether the checking ECU reset mode is enabled or disabled (step S140). When the checking ECU reset mode is disabled, the main ECU 60 determines whether a third condition that the main ECU 60 recognizes that the charging second command is disabled, is satisfied (step S150). When the third condition is not satisfied, the main ECU 60 terminates this routine. In this case, the main ECU 60 keeps the charging relay CHR on and keeps the IGCT relay 62 on, so as to be kept in the active state.

When the third condition is satisfied at step S150, on the other hand, the main ECU 60 turns off the charging relay CHR (step S160) and turns off the IGCT relay 62, so as to be deactivated (step S170) and then terminates this routine. The third condition may be satisfied with the checking ECU reset mode disabled, for example, when the deactivation condition of the main ECU 60 is satisfied to disable the charging first command and the charging second command is accordingly disabled.

When the checking ECU reset mode is enabled at step S140, the main ECU 60 determines whether a fourth condition that the main ECU 60 recognizes that the charging first command is disabled and the charging second command is disabled, is satisfied (step S180). When the fourth condition is not satisfied, the main ECU 60 terminates this routine. In this case, the main ECU 60 keeps the charging relay CHR on and keeps the IGCT relay 62 on, so as to be kept in the active state.

Accordingly, the main ECU 60 enables the checking ECU reset mode when the checking ECU 50 stares resetting (being reactivated) during the external charging to disable the charging second command. In the checking ECU reset mode, when the charging second command is disabled but the charging first command is enabled, the main ECU 60 is kept in the active state to continue managing the battery 36 and keeps the charging relay CHR on. This enables the external charging to be continued. This accordingly suppresses the external charging from being terminated halfway (i.e., suppresses the battery 36 from being charged only insufficiently).

When the fourth condition is satisfied at step S180, on the other hand, the main ECU 60 turns off the charging relay CHR (step S190) and turns off the IGCT relay 62 (step S200), so as to be deactivated and then terminates this routine. The fourth condition may be satisfied with the checking ECU reset mode enabled, for example, when the deactivation condition of the main ECU 60 is satisfied to disable the charging first command and the charging second command is disabled (for example, when the checking ECU 50 is resetting or when the checking ECU 50 does not recognize that the charging first command is enabled after completion of resetting the checking ECU 50.

Figure 3:
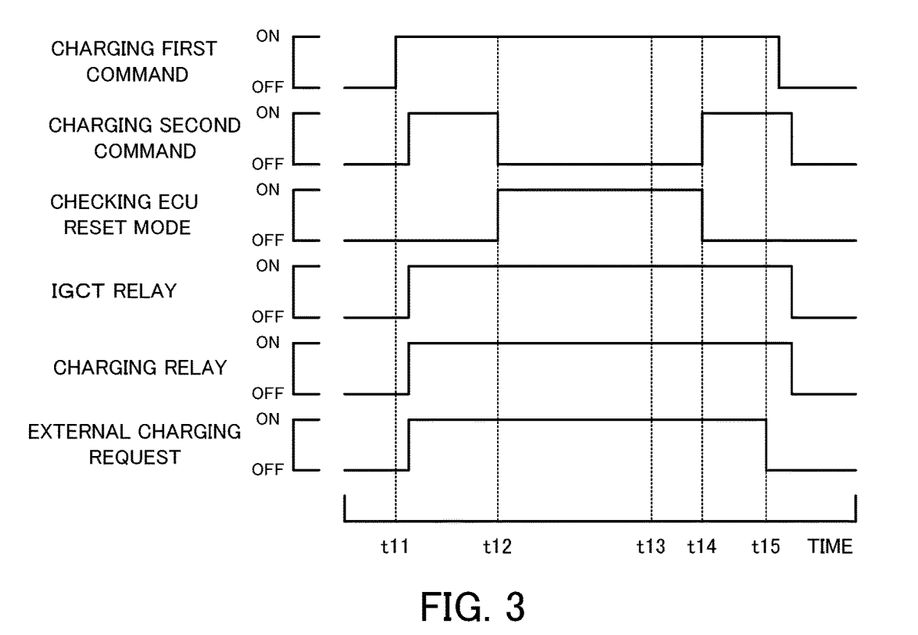
FIG. 3 is a diagram illustrating one example of the external charging (AC charging)

FIG. 3 is a diagram illustrating one example of the external charging (AC charging). As illustrated, when the vehicle-side connector 42 is connected with the power supply device-side connector 92 and the charging first command from the charging ECU 46 is enabled (at a time t11), the charging second command from the checking ECU 50 is enabled to turn on the IGCT relay 62 and activate the main ECU 60. The main ECU 60 then turns on the charging relay CHR and enables the external charging request. This starts the output of an AC power from the AC power supply device 90 and the control of the charger 41 by she charging ECU 46, so as to start charging the battery 36. When the checking ECU 50 starts resetting (being reactivated) (at a time t12) during the external charging, the charging second command is disabled and the checking ECU reset mode is enabled. In the checking ECU reset mode, when the charging second command is disabled but the charging first command is enabled, the IGCT relay 62 is kept on to keep the main ECU 60 active and to keep the charging relay CHR on. This enables the external charging to be continued. This accordingly suppresses the external charging from being terminated halfway (i.e., suppresses the battery 36 from being charged only insufficiently). After completion of resetting the checking ECU 50 (at a time t13), when the checking ECU 50 recognizes that the charging first command is enabled (at a time t14), the charging second command is enabled and the checking ICU reset mode is disabled. After that, when the termination condition of the external charging is satisfied to disable the external charging request (at a time t15), the deactivation condition of the mam ECU 60 is satisfied to disable the charging first command and disable the charging second command. The main ECU 60 then turns off the charging relay HR and turns off the IGCT relay 62, so as to be deactivated.

In the electric vehicle 20 of the embodiment described above, in the state that the main ECU 60 is active for the external charging (AC charging) and the charging relay CHR is kept on, when the main ECU 60 stops receiving the charging second command from the checking ECU 50 (i.e., the charging second command, is disabled) but still receives the charging first command from the charging ECU 46 (i.e., the charging first command is enabled), the main ECU 60 is kept in the active state to continue managing the battery 36 and to keep the charging relay CHR on. This enables the external charging to be continued. This accordingly suppresses the external charging from being terminated halfway (i.e., suppresses the battery 36 from being charged only insufficiently).

According to the embodiment, the electric vehicle 20 activates and deactivates the main ECU 60 according to the on/off of the IGCT relay 62. According to a modification, the main ECU 60 may be always kept in the active state. This modification may skip the processing of steps S170 and S200 in the processing routine of FIG. 2. In the state that the charging relay CHR is kept on for the external charging, when the charging second command is disabled but the charging first command is enabled, the main ECU 60 keeps the charging relay CHR on. This enables the external charging (AC charging) to be continued. This accordingly suppresses the external charging from being terminated halfway (i.e., suppresses the battery 36 from being charged only insufficiently).

In the electric vehicle 20 of the embodiment, the main ECU 60 performs the processing routine of FIG. 2. According to a modification, the main ECU 60 may skip the processing of steps S100 to S170 but perform the processing of steps S180 to S200 in the processing routine of FIG. 2. As in the embodiment described above, in this modification, when the charging second command is disabled but the charging first command is enabled, the main ECU 60 is kept in the active state to continue managing the battery 36 and keeps the charging relay CHR on. This enables the external charging to be continued. This accordingly suppresses the external charging from being terminated halfway (i.e., suppresses the battery 36 from being charged only insufficiently).

Figure 4:
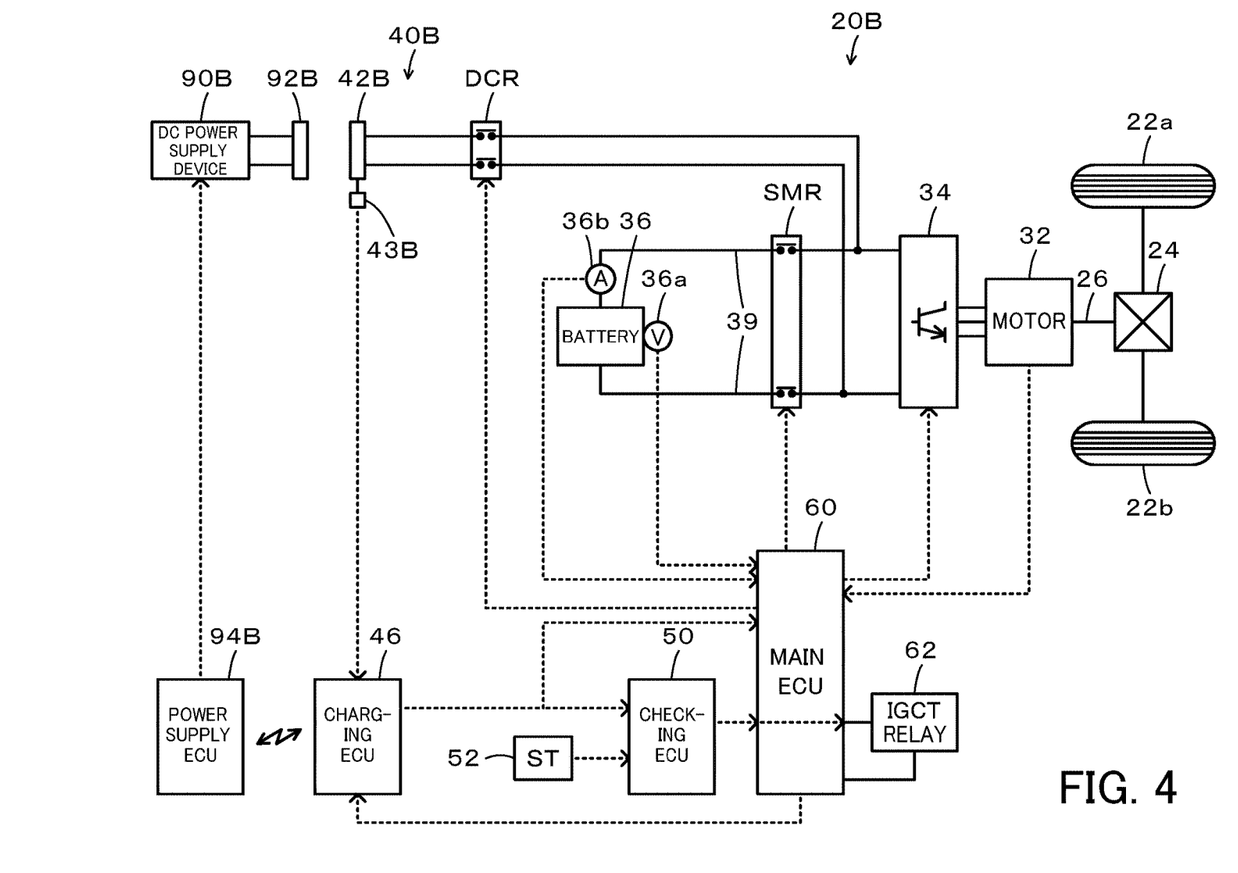
FIG. 4 is a configuration diagram illustrating a schematic configuration of an electric vehicle according to a modification.

According to the embodiment, the electric vehicle 20 is configured to include the charging relay CHR and the charging unit 40 that includes the charger 41 and the vehicle-side connector 42. As shown in FIG. 4, an electric vehicle 20B according to a modification may be configured to include a charging relay DCR and a charging unit 40B that includes a vehicle-side connector 42B, with omission of the charging relay CHR and the charging unit 40 of the electric vehicle 20. In order to avoid duplicated explanation, the like components of the electric vehicle 20B to those of the electric vehicle 20 are expressed by the like reference signs, and their detailed description is omitted.

The vehicle-side connector 42B of the charging unit 40B is connected between the system main relay SMR and the inverter 34 on the power lines 39 and is configured to be connectable with a power supply device-side connector 92B of a DC power supply device 90B that serves as an external supply device at a charging point such as at home or at a charging station. The DC power supply device 90B may be configured as a power supply device to convert an AC power from, for example, a household power supply or an external power supply into a DC power and supply the DC power to the electric vehicle 20. The DC power supply device 90B is controlled by a power supply ECU 94B. Like the power supply ECU 94, the power supply ECU 94B is configured as a CPU-based microprocessor and includes a ROM configured to store processing programs, a RAM configured to temporarily store data, input/output ports and a communication port, in addition to the CPU. This power supply ECU 94B is configured to be communicable with the charging ECU 46 of the electric vehicle 20B.

The charging relay DCR is provided between the system main relay SMR/ inverter 34-side and the vehicle-side connector 42B-side on the power lines 39. The charging relay DCR is controlled on and off by the main ECU 60 to connect and disconnect the system main relay SMR/inverter 34-side and the vehicle-side connector 42B-side with each other and from each other The charging ECU 46 also obtains, via its input port, the input of a connection signal from a connection sensor 43B configured to detect whether the vehicle-side connector 42B is connected with the power supply device-side connector 92B. The main ECU 60 also outputs control signals to the charging relay DCR via its output port.

The following describes the operations of the electric vehicle 20B of the modification having the above configuration or more specifically a series of operations to perform external charging (DC charging) that charges the battery 36 with electric power from the DC power supply device 90B. When the vehicle-side connector 42B is connected with the power supply device-side connector 92B in the off position of the start switch 52 at a charging point such as at home or at a charging station, the charging ECU 46 starts sending a charging first command to the checking ECU 50 and the main ECU 60 (i.e., enables the charging first command). When the checking ECU 50 receives the charging first command from the charging ECU 46 (i.e., when the checking ECU 50 recognizes that the charging first command is enabled), the checking ECU 50 sends a charging second command to the main ECU 60 (i.e., enables the charging second command or keeps the charging second command enabled). When the main ECU 60 starts receiving the charging second command from the checking ECU 50 (i.e., when the main ECU 60 starts recognizing that the charging second command is enabled), the IGCT relay 62 is turned on to activate the main ECU 60. The main ECU 60 then turns on the system main relay SMR and the charging relay DCR and starts sending an external charging request to the charging ECU 46 (i.e., enables the external charging request). When the charging ECU 46 starts receiving the external charging request from the main ECU 60 (i.e., when the charging ECU 46 starts recognizing that the external charging request is enabled), the charging ECU 46 starts sending a DC power supply instruction to the power supply ECU 94B. When the power supply ECU 94B receives the DC power supply instruction, the power supply ECU 94B controls the DC power supply device 90B such as to cause a DC power to be output from the DC power supply device 90B. Starting the output of the DC power from the DC power supply device 90B starts charging the battery 36. When the state of charge SOC of the battery 36 reaches or exceeds a reference value Sref by the external charging (DC charging) and a termination condition of the external charging is satisfied, the main ECU 60 stops sending the external charging request to the charging ECU 46 (i.e., disables the external charging request). When the charging ECU 46 stops receiving the external charging request from the main ECU 60 or when the vehicle-side connector 428 is disconnected from the power supply device-side connector 92B and a deactivation condition of the main ECU 60 is satisfied, the charging ECU 46 stops sending the DC power supply instruction to the power supply ECU 94B. Stopping the output of the DC power from the DC power supply device 90B stops charging the battery 36. When the deactivation condition of the main ECU 60 is satisfied, the charging ECU 46 also stops sending the charging first command to the checking ECU 50 and the main ECU 60 (i.e., disables the charging first command). When the checking ECU 50 stops receiving the charging first command from the charging ECU 46 (i.e., when the checking ECU 50 recognizes that the charging first command is disabled), the checking ECU 50 stops sending the charging second command to the main ECU 60 (i.e., disables the charging second command). The IGCT relay 62 is then turned off to deactivate the main ECU 60 according to processing routine of FIG. 5. The time intervals of sending the charging first command, the charging second command and the external charging request and the time intervals of recognition according to the modification are similar to those according to the embodiment.

Figure 5:
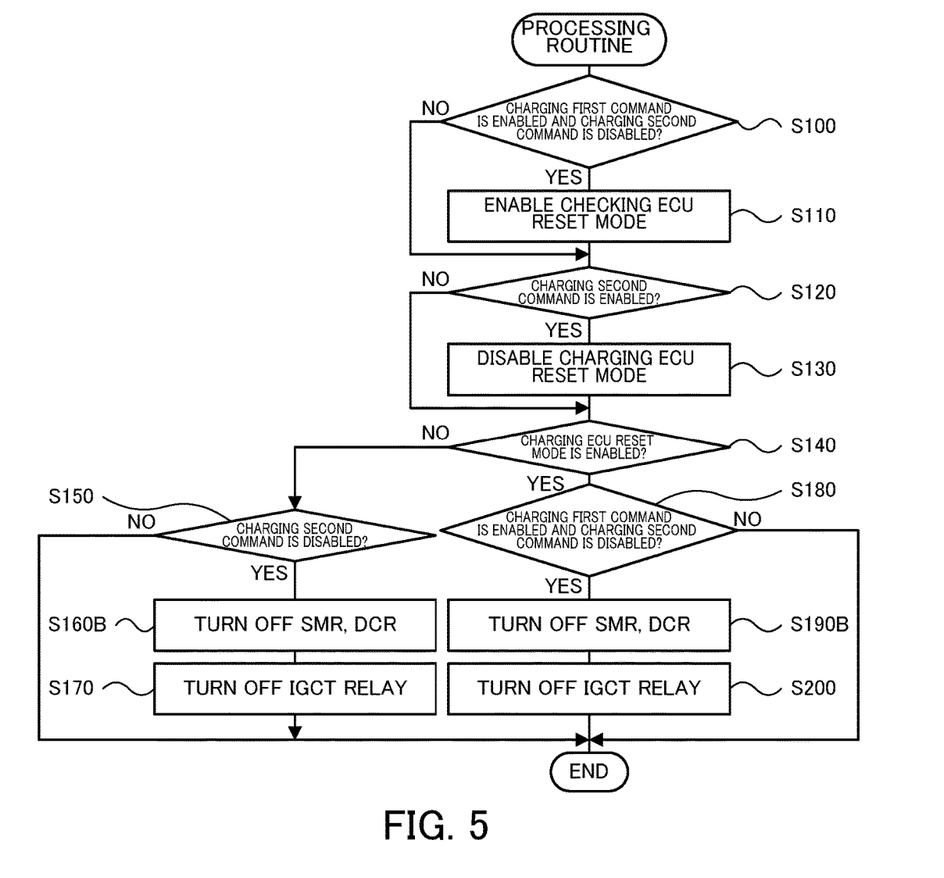
FIG. 5 is a chart showing one example of a processing routine performed by a main ECU according to the modification.

FIG. 5 is a chart showing one example of a processing routine performed by the main ECU 60. This routine is performed repeatedly at the predetermined time intervals T0 when the main ECU 60 is in the active state to keep the system main relay SMR on and keep the charging relay DCR on. The processing routine of FIG. 5 is similar to the processing routine of FIG. 2, except performing the processing of steps S160B and S190B in place of the processing of steps S160 and S190 and that disabling system main relay SMR and the charging relay DCR in place of disabling the charging relay CHR.

When the checking ECU 50 starts resetting (being reactivated) and the charging second command is disabled during the external charging, the main ECU 60 enables the checking ECU reset mode. In the checking ECU reset mode, when the charging second command is disabled but the charging first command is enabled, the main ECU 60 is kept in the active state to continue managing the battery 36 and keeps the system main relay SMR on and the charging relay DCR on. This enables the external charging to be continued. This accordingly suppresses the external charging from being terminated halfway (i.e., suppresses the battery 36 from being charged only insufficiently).

The electric vehicle 20B of this modification activates and deactivates the main ECU 60 according to the on/off of the IGCT relay 62. According to another modification, the main ECU 60 may be always kept in the active state. This modification may skip the processing of steps S170 and S200 in the processing routine of FIG. 5. In the state that the system main relay SMR and the charging relay DCR are kept on for the external charging (DC charging), when the charging second command is disabled but the charging first command is enabled, the main ECU 60 keeps the system main relay SMR on and the charging relay DCR on. This enables the external charging (DC charging) to be continued. This accordingly suppresses the external charging from being terminated halfway (i.e., suppresses the battery 36 from being charged only insufficiently).

In the electric vehicle 20B of the modification, the main ECU 60 performs the processing routine of FIG. 5. According to a modification, the main ECU 60 may skip the processing of steps S100 to S170 but perform the processing of steps S180 to S200 in the processing routine of FIG. 5. As in the electric vehicle 20B of the modification described above, in this modification, when the charging second command is disabled but the charging first command is enabled, the main ECU 60 is kept in the active state to continue managing the battery 36 and keeps the system main relay SMR on and the charging relay DCR on. This enables the external charging to be continued. This accordingly suppresses the external charging from being terminated halfway (i.e., suppresses the battery 36 from being charged only insufficiently).

In the electric vehicle 20 of the embodiment or in the electric vehicle 20B of the modification, after the charging first command is enabled, the charging ECU 46 keeps the charging first command enabled at the predetermined time interval T1 until the deactivation condition of the main ECU 60 is satisfied. When the deactivation condition of the main ECU 60 is satisfied, the charging ECU 46 disables the charging first command. When the checking ECU 50 recognizes that the charging first command is enabled at the predetermined time interval T2, the checking ECU 50 enables the charging second command or keeps the charging second command enabled. When the checking ECU 50 recognizes that the charging first command is disabled, when the checking ECU 50 is resetting, or when the checking ECU 50 does not recognize that the charging first command is enabled after completion of resetting the checking ECU 50, the checking ECU 50 disables the charging second command or keeps the charging second command disabled. The time interval when the charging ECU 46 keeps the charging first command enabled and the time interval when the checking ECU 50 enables or disables the charging second command may be an identical time interval (for example, the predetermined time interval T2).

The electric vehicle 20 of the embodiment is configured to include the charging unit 40 and the charging relay CHR that is provided between the charging unit 40 and the battery 36. The electric vehicle 20B of the modification is configured to include the charging unit 40B and the system main relay SMR and the charging relay DCR provided between the charging unit 40B and the battery 36. An electric vehicle of another modification may be configured to include the charging units 40 and 40B, the system main relay SMR and the charging relays CHR and DCR.

The electric vehicle 20 of the embodiment or the electric vehicle 20B of the modification uses the battery 36 as the power storage device but may use a capacitor as the power storage device.

The electric vehicle 20 of the embodiment or the electric vehicle 20B of the modification is configured to include the motor 32 connected with the driveshaft 26 that is coupled with the drive wheels 22a and 22b, and the inverter 34 configured to drive the motor 32 and transmit electric power to and from the battery 36, as the driving system. According to another modification, the driving system may be configured to include an engine and a generator that are connected with the driveshaft 26 via a planetary gear and an inverter for generator configured to drive the generator and transmit electric power to and from the battery 36, in addition to the motor 32 and the inverter 34. According to yet another modification, the driving system may be configured to include an engine, a generator connected with an output shaft of the engine, and an inverter for generator configured to drive the generator and transmit electric power to and from the generator, in addition to the motor 32 and the inverter 34. Furthermore, according to another modification, the driving system may be configured to include a transmission provided between the motor 32 and the battery 36 and an engine connected via a clutch on an opposite side to the transmission across the motor 32, in addition to the motor 32 and the inverter 34.

In the motor vehicle according to the first aspect of the present disclosure, the third control device may start sending a third command after the third control device is activated, and stop sending the third command when a termination condition of the external charging is satisfied, the first control device may stop sending the first command when the first control device starts receiving the third command from the third control device and subsequently stops receiving the third command, and the third control device in the active state may be deactivated when the third control device stops receiving the first command and the second command. This configuration enables the third control device to be deactivated when the third control device stops sending the third command on satisfaction of the termination condition of the external charging, the first control device accordingly stops sending the first command, and the third control device thereby stops receiving both the first command and the second command.

In this case, a time interval of sending the first command from the first control device may be longer than a time interval of sending the second command from the second control device, and upon non-satisfaction of a predetermined condition that the third control device receives the first command but does not receive the second command, the third control device in the active state may be deactivated when the third control device stops receiving the second command. When the predetermined condition is not satisfied, this configuration allows for the determination of whether the third control device is deactivated, using only the second command.

In the motor vehicle according to the first aspect of the present disclosure, the motor vehicle may further include a relay provided between the power storage device and the vehicle-side connector. The motor vehicle may be configured to perform the external charging, when the vehicle-side connector is connected with the external power supply device, the third control device is in the active state and the relay is on. The third control device may be activated to turn on the relay when the third control device starts receiving the second command from the second control device, the third control device is kept in the active state and keeps the relay on when the third control device is in the active state, the relay it on and the third control device receives the second command from the second control device, and the third control device may be kept in the active state and keep the relay on when the third control device is in the active state, the relay is on, and the third control device stops receiving the second command from the second control device but still receives the first command from the first control device. Even when the second control device stops sending the second command (i.e., even when the third control device stops receiving the second command) during the external charging, this configuration enables the third control device to be kept in the active state and continue managing the power storage device and to keep the relay on as long as the third control device receives the first command. As a result, this enables the external charging to be continued.

In the motor vehicle according to the second aspect of the present disclosure, the third control device may turn on the relay and start sending a third command, and subsequently stop sending the third command when a termination condition of the external charging is satisfied. The first control device may stop sending the first command when the first control device starts receiving the third command from the third control device and subsequently stops receiving the third command. The third control device may turn off the relay when the relay is on and the third control device stops receiving the first command and the second command. This configuration enables to turn off the relay when the third control device stops sending the third command on satisfaction of the termination condition of the external charging, the first control device accordingly stops sending the first command, and the third control device thereby stops receiving both the first command and the second command.

In this case, a time interval of sending the first command from the first control device may be longer than a time interval of sending the second command from the second control device, and upon non-satisfaction of a predetermined condition that the third control device receives the first command but does not receive the second command, the third control device in the active state may turn off the relay when the third control device stops receiving the second command. When the predetermined condition is not satisfied, this configuration allows for the determination of whether the relay is turned off, using only the second command.

The following describes the correspondence relationship between the primary components of the embodiment and the primary components of the disclosure described in Summary. Between the motor vehicle according to the first/second aspect and the embodiment, the battery 36 of the embodiment corresponds to the "power storage device", the vehicle-side connector 42 corresponds to the "vehicle-side connector", the charging ECU 46 corresponds to the "first control device", the checking ECU 50 corresponds to the "second control device" and the main ECU 60 corresponds to the "third control device". Between the motor vehicle according to the second aspect and the embodiment, the charging relay CHR, the system main relay SMR and the charging relay DCR correspond to the "relay".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure may be applicable to the manufacturing industries of the motor vehicle and so on.

The invention claimed is:

1. A motor vehicle, comprising:
a power storage device configured to transmit electric power to and from a driving system for driving the motor vehicle;
a vehicle-side connector connected with the power storage device and configured to be connectable with an external power supply device;
a first control device configured to start sending a first command when the vehicle-side connector is connected with the external power supply device;
a second control device configured to send a second command when the second control device receives the first command from the first control device; and
a third control device configured to be activated to an active state when the third control device starts receiving the second command from the second control device, to be kept in the active state when the third control device in the active state receives the second command from the second control device, and to manage the power storage device when the third control device is in the active state,
the motor vehicle being configured to perform external charging that charges the power storage device with an electric power from the external power supply device when the vehicle-side connector is connected with the external power supply device and the third control device is in the active state,
wherein
the third control device is configured to be communicable with the first control device arid to be kept in the active state when the third control device in the active state stops receiving the second command from the second control device but still receives the first command from the first control device.

2. The motor vehicle according to claim 1,
wherein the third control device starts sending a third command after the third control device is activated, and stops sending the third command when a termination condition of the external charging is satisfied,
the first control device stops sending the first command when the first control device starts receiving the third command from the third control device and subsequently stops receiving the third command, and
the third control device in the active state is deactivated when the third control device stops receiving the first command and the second command.

3. The motor vehicle according to claim 2,
wherein a time interval of sending the first command from the first control device is longer than a time interval of sending the second command from the second control device, and
upon non-satisfaction of a predetermined condition that the third control device receives the first command but does not receive the second command, the third control device in the active state is deactivated when the third control device stops receiving the second command.

4. The motor vehicle according to claim 1, further comprising:
a relay provided between the power storage device and the vehicle-side connector,
the motor vehicle being configured to perform the external charging, when the vehicle-side connector is connected with the external power supply device, the third control device is in the active state and the relay is on, wherein
the third control device is activated to turn on the relay when the third control device starts receiving the second command from the second control device,
the third control device is kept in the active state and beeps the relay on when the third control device is in the active state, the relay is on and the third control device receives the second command from the second control device, and
the third control device is kept in the active state and keeps the relay on when the third control device is in the active state, the relay is on, and the third control device stops receiving the second command from the second control device but still receives the first command from the first control device.

5. A motor vehicle, comprising:
a power storage device configured to transmit electric power to and from a driving system for driving the motor vehicle;
a vehicle-side connector connected with the power storage device and configured to be connectable with an external power supply device;
a relay provided between the power storage device and the vehicle-side connector;
a first control device configured to start sending a first command when the vehicle-side connector is connected with the external power supply device;
a second control device configured to send a second command when the second control device receives the first command from the first control device; and
a third control device configured to turn on the relay when the third control device starts receiving the second command from the second control device, and to keep the relay on when the relay is on and the third control device receives the second command from the second control device,
the motor vehicle being configured to perform external charging that charges the power storage device with an electric power from the external power supply device when the vehicle-side connector is connected with the external power supply device and the relay is on, wherein
the third control device is configured to be communicable with the first control device and to keep the relay on when the relay is on and the third control device stops receiving the second command from the second control device but still receives the first command from the first control device.

6. The motor vehicle according to claim 5,
wherein the third control device turns on the relay and starts sending a third command, and subsequently stops sending the third command when a termination condition of the external charging is satisfied,
the first control device stops sending the first command when the first control device starts receiving the third command from the third control device and subsequently stops receiving the third command, and
the third control device turns off the relay when the relay is on and the third control device stops receiving the first command and the second command.

7. The motor vehicle according to claim 6,
wherein a time interval of sending the first command from the first control device is longer than a time interval of sending the second command from the second control device, and
upon non-satisfaction of a predetermined condition that the third control device receives the first command but does not receive the second command, the third control device in the active state turns off the relay when the third control device stops receiving the second command.

\* \* \* \* \*

UNITED STATES PATENT AND TRADEMARK OFFICE
CERTIFICATE OF CORRECTION

PATENT NO. : 10,399,444 B2  
APPLICATION NO. : 15/821024  
DATED : September 3, 2019  
INVENTOR(S) : Shingo Ohiwa Page 1 of 1

It is certified that error appears in the above-identified patent and that said Letters Patent is hereby corrected as shown below:

In the Specification

In Column 2, Line 10, delete "eternal" and insert --external--, therefor.

In Column 2, Line 33, delete "eternal" and insert --external--, therefor.

In Column 3, Line 7, delete "eternal" and insert --external--, therefor.

In Column 3, Line 29, delete "eternal" and insert --external--, therefor.

In Column 8, Line 32, delete "stares" and insert --starts--, therefor.

In Column 9, Line 17, delete "mam" and insert --main--, therefor.

In Column 15, Line 41, delete "arid" and insert --and--, therefor.

Signed and Sealed this  
Twenty-ninth Day of October, 2019

Andrei Iancu  
*Director of the United States Patent and Trademark Office*